United States Patent
Bosselmann et al.

(10) Patent No.: US 7,095,221 B2
(45) Date of Patent: Aug. 22, 2006

(54) DOPPLER RADAR SENSING SYSTEM FOR MONITORING TURBINE GENERATOR COMPONENTS

(75) Inventors: Thomas Bosselmann, Marloffstein (DE); Michael Willsch, Furth (DE); Francisco Javier Sevilla Perez, Erlangen (DE); Zal Sanjana, Pittsburgh, PA (US)

(73) Assignee: Siemens Aktiengesellschaft, Munich (DE)

( * ) Notice: Subject to any disclaimer, the term of this patent is extended or adjusted under 35 U.S.C. 154(b) by 198 days.

(21) Appl. No.: 10/855,021

(22) Filed: May 27, 2004

(65) Prior Publication Data

US 2005/0264275 A1   Dec. 1, 2005

(51) Int. Cl.
*G01N 27/00* (2006.01)
*G01S 13/08* (2006.01)

(52) U.S. Cl. .................... 324/71.1; 342/118
(58) Field of Classification Search ............. 324/71.1, 324/637, 644, 642, 158, 646; 342/22, 84, 342/9, 104, 114, 115, 418, 171, 173, 402, 342/405, 357.05, 118, 124, 125, 99; 73/168, 73/662, 660; 356/445, 237.2
See application file for complete search history.

(56) References Cited

U.S. PATENT DOCUMENTS

| | | | |
|---|---|---|---|
| 3,973,259 A | 8/1976 | Hellgren et al. | |
| 4,131,889 A * | 12/1978 | Gray | 342/114 |
| 4,507,658 A | 3/1985 | Keating | |
| 4,911,005 A * | 3/1990 | Heyn et al. | 73/187 |
| 5,104,063 A * | 4/1992 | Hartley | 244/103 S |
| 5,333,814 A * | 8/1994 | Wallis | 244/1 TD |
| 5,365,787 A | 11/1994 | Hernandez et al. | |
| 5,411,364 A * | 5/1995 | Aberg et al. | 415/9 |
| 5,479,826 A * | 1/1996 | Twerdochlib et al. | 73/660 |
| 5,849,416 A * | 12/1998 | Coffinberry et al. | 428/447 |
| 6,489,917 B1 * | 12/2002 | Geisheimer et al. | 342/127 |
| 6,512,379 B1 * | 1/2003 | Harrold et al. | 324/632 |
| 6,711,506 B1 * | 3/2004 | Bales et al. | 702/35 |
| 6,750,454 B1 * | 6/2004 | Brown et al. | 250/341.6 |
| 6,914,552 B1 * | 7/2005 | McEwan | 342/22 |
| 6,968,730 B1 * | 11/2005 | Schafrik et al. | 73/105 |
| 2002/0097180 A1 | 7/2002 | Geisheimer et al. | |
| 2004/0226351 A1 * | 11/2004 | Schafrik et al. | 73/105 |

FOREIGN PATENT DOCUMENTS

WO  WO 2004/042199 A2  5/2004

* cited by examiner

*Primary Examiner*—Anjan Deb
*Assistant Examiner*—Hoai-An D. Nguyen

(57) ABSTRACT

The invention provides a sensing system and a method for monitoring the damage to turbine components in a turbine generator. The sensing system comprises an electromagnetic wave generator that generates an electromagnetic wave; a transmitter that transmits the generated electromagnetic wave from a first turbine component; a second turbine component that receives the transmitted electromagnetic wave and reflects the electromagnetic wave; a receiver that receives the reflected electromagnetic wave; and a processor that interprets the received electromagnetic wave.

14 Claims, 4 Drawing Sheets

DOPPLER RADAR SENSING SYSTEM FOR MONITORING TURBINE GENERATOR COMPONENTS

FIELD OF INVENTION

The present invention relates generally to Doppler radar based sensing systems and, more particularly, to Doppler radar sensing systems for monitoring turbine generator components during normal operation.

BACKGROUND OF INVENTION

Gas turbine engines are known to include a compressor section, a combustor section, and a turbine section. Many components that form the turbine section, such as the stationary vanes, rotating blades and surrounding ring segments, are directly exposed to hot combustion gasses that can exceed 1500 degrees C. and travel at velocities approaching the speed of sound. The rotating blades and stationary vanes are arranged circumferentially in rows with each row being comprised of a plurality of blades and vanes. To help shield the turbine components from this extreme and damaging operating environment, they are often coated with ceramic thermal barrier coating materials, such as ytrria stabilized zirconia oxide (YSZ).

However, thermal barrier coatings tend to chip, delaminate, or spall from the underlying turbine component during operational service life, thereby causing a damaged turbine component. Moreover, the spalled thermal barrier coating itself can constitute a harmful foreign object within the gas path that damages other turbine components.

In the past, inspection for damage to turbine components has been performed by partially disassembling the gas turbine engine and performing visual inspections on individual components. In-situ visual inspections may be performed without engine disassembly by using a borescope inserted into a gas turbine engine, but such procedures are labor intensive, time consuming, costly, and require that the gas turbine engine be shut down.

Due to the strong economic incentive to inspect for turbine component damage while the gas turbine is operating, various on-line and real-time methods and apparatus for detecting and locating defects in turbine components while the turbine engine is in operation have been proposed, including acoustic, optical and infrared. However, each of these methods and apparatus have appreciable disadvantages.

Accordingly, there continues to be a need for methods and apparatus for the on-line and/or real-time detection of damage to turbine components.

SUMMARY OF INVENTION

The present invention provides a sensing system for a gas turbine engine. Among other things, the sensing system advantageously allows for real time (i.e. delay less than a few seconds) monitoring of damage to turbine components during operation of the turbine engine.

One aspect of the invention involves an apparatus for the non-destructive monitoring of a coated metallic turbine component, comprising an electromagnetic wave generator that generates an electromagnetic wave, a transmitter that transmits the generated electromagnetic wave from a first turbine component, a second turbine component that receives the transmitted electromagnetic wave and reflects the electromagnetic wave, a receiver that receives the reflected electromagnetic wave, and a processor that interprets the received electromagnetic wave.

Another aspect of the invention includes a turbine blade or vane adapted for determining thermal barrier coating damage, comprising a blade or vane having an aerodynamic shape and a depression located on a surface of the blade or vane; and an antenna having a geometry adapted to be operatively assembled with the depression and adapted to closely match the aerodynamic shape of the turbine component.

Yet another aspect of the invention provides a method to monitor in real time the damage, to a turbine component in a turbine generator, comprising transmitting a signal in the form of an electromagnetic wave from a first component, receiving the signal transmitted from the first component by a second component, reflecting the transmitted signal off the second component back to the transmission source, and processing the transmitted and reflected signals to determine if the turbine component is damaged.

BRIEF DESCRIPTION OF THE DRAWINGS

The above-mentioned and other concepts of the present invention will now be described with reference to the drawings of the exemplary and preferred embodiments of the present invention. The illustrated embodiments are intended to illustrate, but not to limit the invention. The drawings contain the following figures, in which like numbers refer to like parts throughout the description and drawings and wherein.

DETAILED DESCRIPTION OF INVENTION

Figure 1:
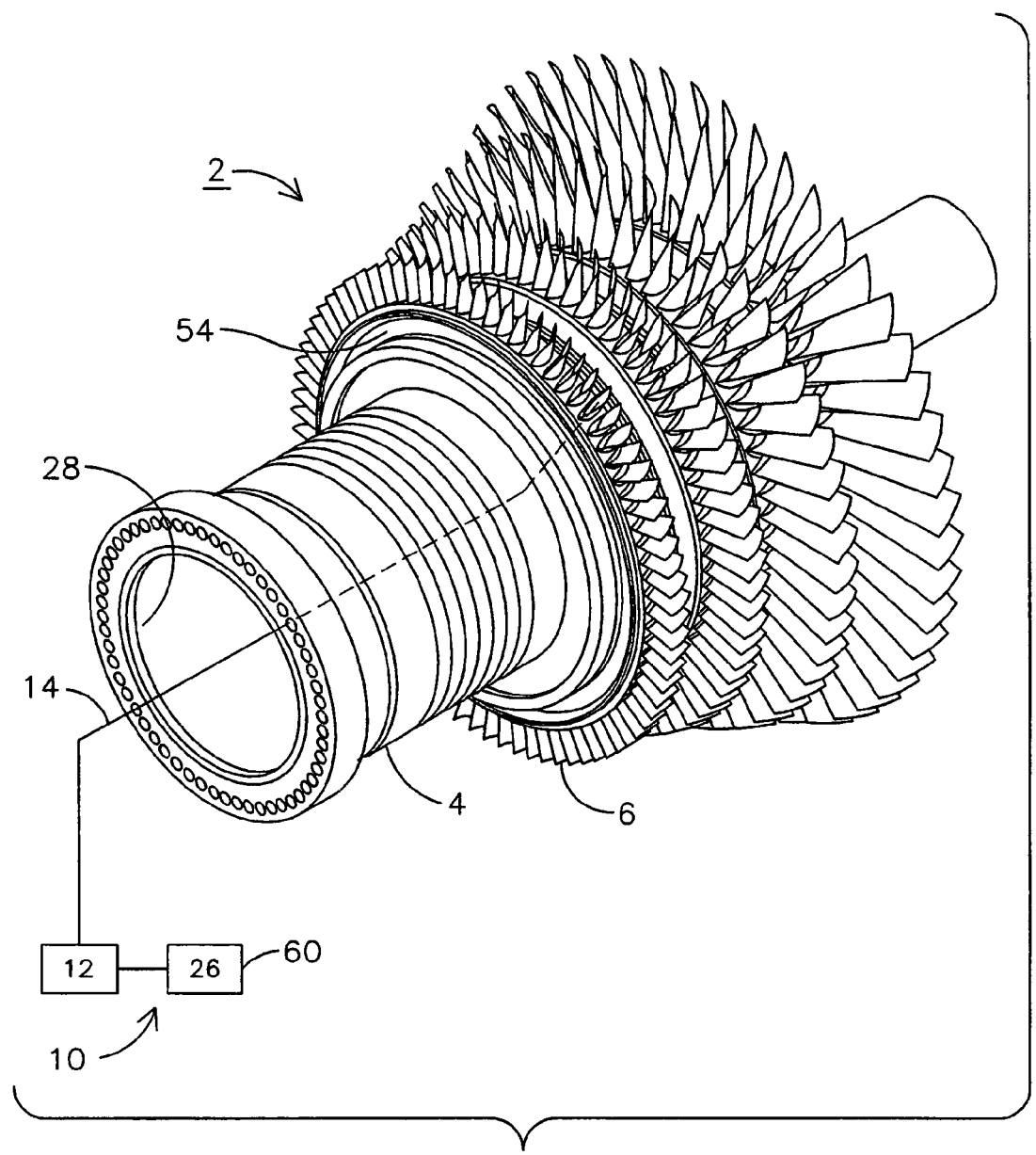
FIG. 1 is a perspective view of a turbine section of a gas turbine.

The monitoring device described herein employs some basic concepts. For example, one concept relates to a Doppler based sensing system to monitor damage to a turbine component. Another concept relates to a blade adapted to house a portion of the sensing system. Another concept relates to the processing of Doppler signal information regarding turbine components into a usable computer output.

The present invention is disclosed in context of use as a sensing system within a gas turbine engine for monitoring damage to turbine components. The principles of the present invention, however, are not limited to use within gas turbine engines or to monitor turbine component damage. For example, the sensing system could be used in other operational monitoring environments to detect damage to objects, such as steam turbines, aero-thermal aircraft engines, electric generators, air or gas compressors, auxiliary power plants, and the like. Other types of damage that can be monitored includes cracks and broken components. One skilled in the art may find additional applications for the apparatus, processes, systems, components, configurations, methods and applications disclosed herein. Thus, the illustration and description of the present invention in context of an exemplary gas turbine engine for monitoring damage to turbine components is merely one possible application of the present invention. However, the present invention has particular applicability for use as a sensing system for monitoring damage to turbine components.

To assist in the description of the claimed invention and its operation, the following cylindrical coordinate system is introduced. The X—X axis defines the axial direction and extends in the direction of the rotor centerline. Axis Y—Y defines the radial direction and extends radially tangential to the axial direction and outward through the blade or vane. The Z—Z axis defines the tangential direction and extends in the plane created by the X—X axis and Y—Y axis and defines rotation.

Components

Referring now to FIGS. 1, 2, 4a and 4b, an exemplary Doppler radar sensing system adapted to monitor damage to turbine components is provided. The sensing system 10 advantageously comprises a transmitter such as radar 12 configured to transmit an electromagnetic wave such as microwave 18. The microwave 18 is carried by a wave-guide 14, exits through an antenna 16, and is directed toward an object 8. The object 8 is radiated by the transmitted microwave 18 and reflects a reflected microwave 24 which is received by the antenna 16. The reflected microwave 24 then travels back through the wave-guide 14 to the radar 10 circuitry and is dispatched to a processor 26. The processor 26 is configured with logic to measure a frequency shift or intensity change resulting from the change of surface material composition of the object 8 between the transmitted microwave 18 and the reflected microwave 24. The processor 26 is further configured with logic to relate the intensity and frequency of the reflected electromagnetic wave 24 to the intensity and frequency of the transmitted electromagnetic wave 18. The processed information can then be output to a computer screen using conventional computer program applications.

Figure 2:
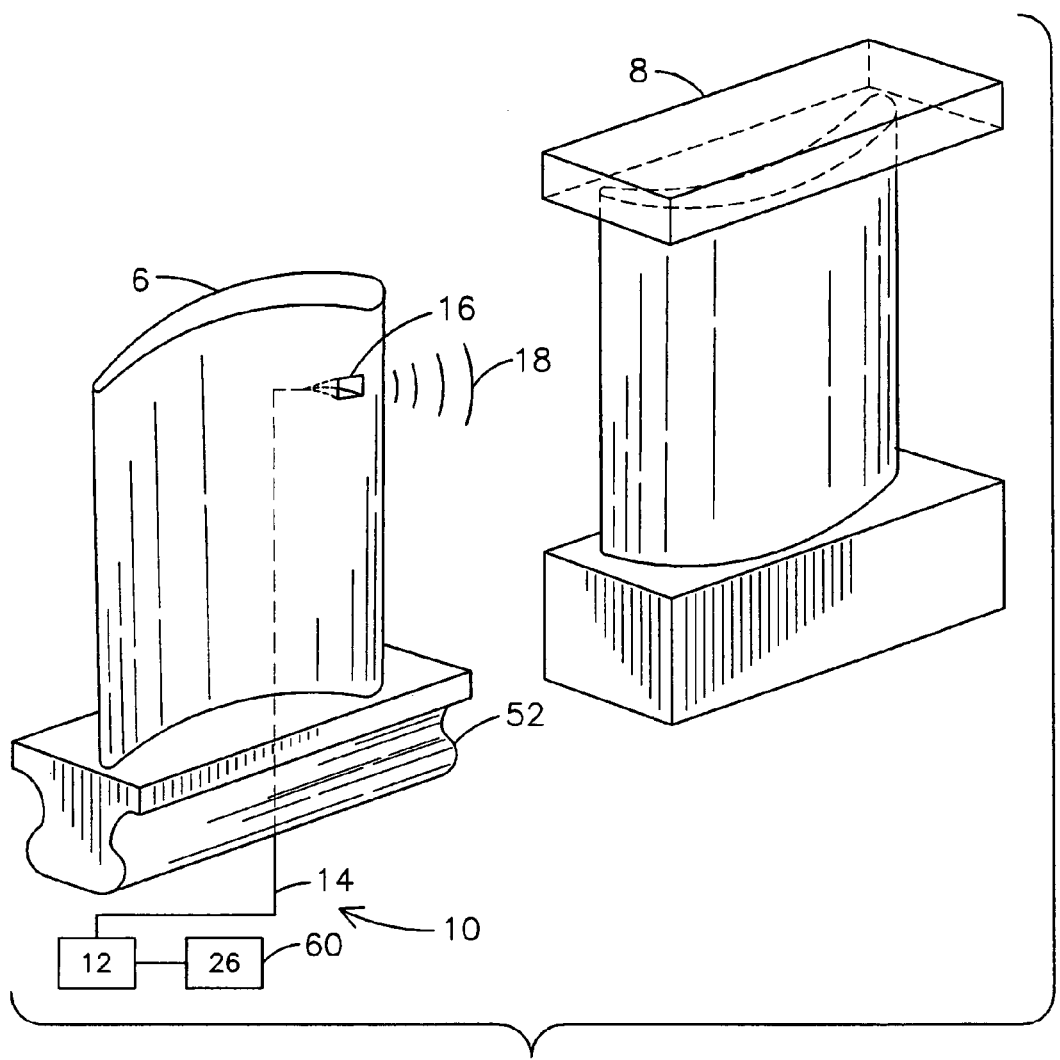
FIG. 2 is a perspective view of a sensing system of the present invention.
Figure 3:
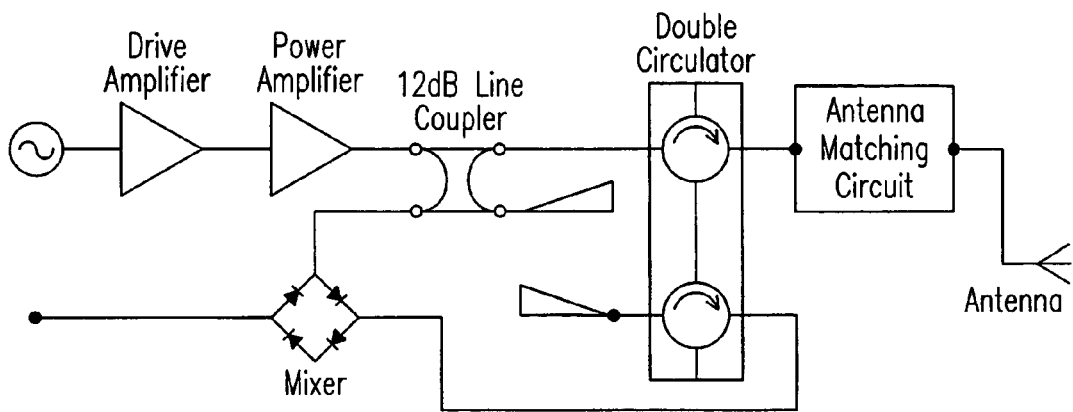
FIG. 3 is a schematic diagram of an exemplary Doppler radar scheme.

Referring now to FIGS. 1 and 2, a transmitter 12 is used to generate an electromagnetic wave 18 of a suitable frequency, wavelength, and intensity to radiate an object 8 and reflect the electromagnetic wave 18 back to the transmitter 12. The transmitter 12 is advantageously embodied as a radar. A suitable radar is commercially available from the PRO NOVA company, although those skilled in the art will readily appreciate that a wide variety of other radars and transmitters 12 could be used to achieve the purposes of the present invention. A suitable radar 12 configuration is shown in FIG. 3. The radar 12 may generate and emit the electromagnetic wave 18 continually, randomly, intermittently, graduated, or otherwise, although continuous electromagnetic wave 18 emission is preferred for a more robust monitoring of the turbine component.

The electromagnetic wave 18 generated by the radar 12 is advantageously a microwave in the frequency range of 1 giga hertz (GHz) to 100 GHz to adequately measure TBC loss, more preferably, in the range of 20 GHz to 50 GHz. However, the electromagnetic wave 18 need not be microwave or within the 1 to 100 GHz range and may operate in a higher or lower frequency spectrum, for example, in the deep infrared range of 30 tera hertz (THz) to 300 THz and in the ultraviolet region around 1500 THz.

A wave-guide 14 is used to transfer the microwave 18 from the radar 12 to an antenna 16. The wave-guide 14 may be of any cross sectional configuration, although a rectangular or cylindrical cross section is preferred, since a rectangular wave-guide 14 provides a greater bandwidth but a cylindrical wave-guide 14 allows for easier handling and installation. Also, since cumulative wave-guide 14 losses will be a function of the length, the amount of turning from the radar 10 to the antenna 16, the frequency of the microwave 18, and cross section used. Thus, it is preferable, but not necessary, to reduce the wave-guide 14 length without compromising the performance of the sensing system 10. Alternatively, the wave-guide 14 may comprise a plurality of connected cross sectional shapes that collectively form a continuous wave-guide 14. Suitable wave-guides 14 are commercially available from the Microtech Inc. company as part numbers WR12, WR15, WR28, and WR34.

The antenna 16 sends the transmitted microwave 18 and is capable of receiving the reflected microwave 24. The illustrated antenna 16 is connected to the wave-guide 14 at the opposite end of the radar 12. The antenna 16 is advantageously located near the radar 10 to reduce the length of the wave-guide 14 and thereby reducing losses. The illustrated antenna 16 is a horn antenna that radially distributes the microwave 18 from the antenna 16. However, other antennas can be used, for example, a directional antenna can be used to direct the microwave 18 towards a particular object 8. The antenna 16 is advantageously attached to a support object 6 (e.g. rotating blade 6) such that the open end of the antenna 16 is approximately flush with the contour of the airfoil surface of the blade 6 to reduce thermodynamic losses of the turbine 2. The antenna 16 is positioned and oriented on the surface of the object 6 to allow the microwave 18 to be dispatched toward the reflecting object 8 (e.g. stationary vane 8).

An area of coverage 50 is formed by the location and orientation of the antenna 16, as well as the frequency and intensity of the microwave 18. The portion of the object 8 that reflects the microwave 18 back to the antenna 16 should be located within the area of coverage 50. For example, if the outer section of the stationary vane 8 is the reflecting object, then the antenna 16 is advantageously arranged at a distance on the Y—Y axis further from the rotor centerline (Axis X—X) to better locate the area of coverage 50 of the transmitted microwave 18 on the portion of the stationary vane 8 to be monitored. Also, arranging the antenna 16 near (e.g. 0% airfoil chord to 75% airfoil chord, preferably 5% airfoil chord to 30% airfoil chord.) the leading edge of the blade 6 advantageously allows the electromagnetic wave 18 to be more directly aimed at the vane 8. A suitable antenna 16 is commercially available from the Millimetric Company.

Figure 4A:
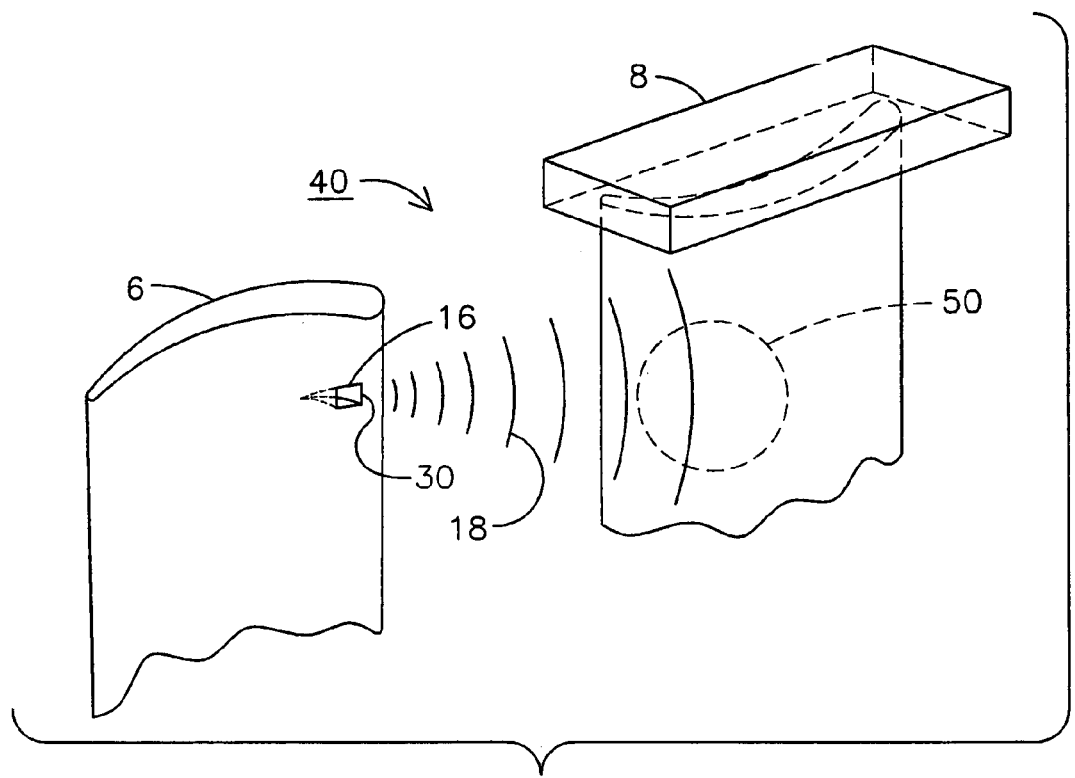
FIG. 4a is a perspective view of an electromagnetic wave signal sent from a transmitter on a blade toward a vane.
Figure 4B:
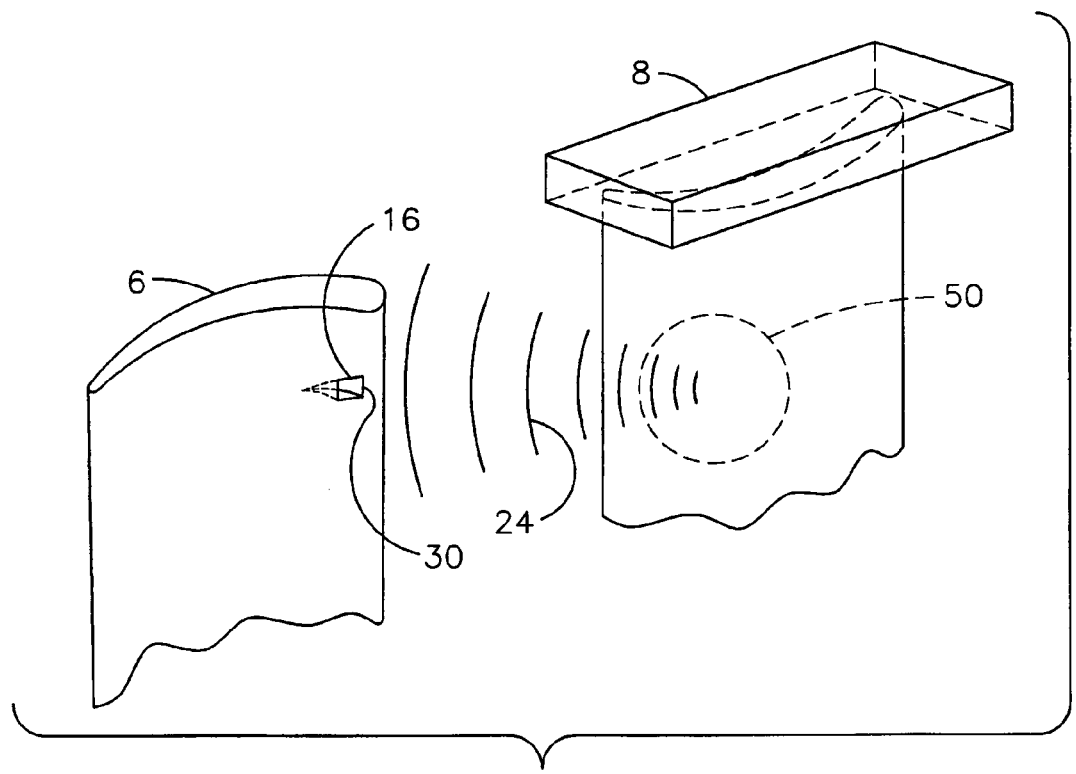
FIG. 4b is a perspective view similar to FIG. 4a, showing the signal reflected from the vane back to the blade.
Figure 5:
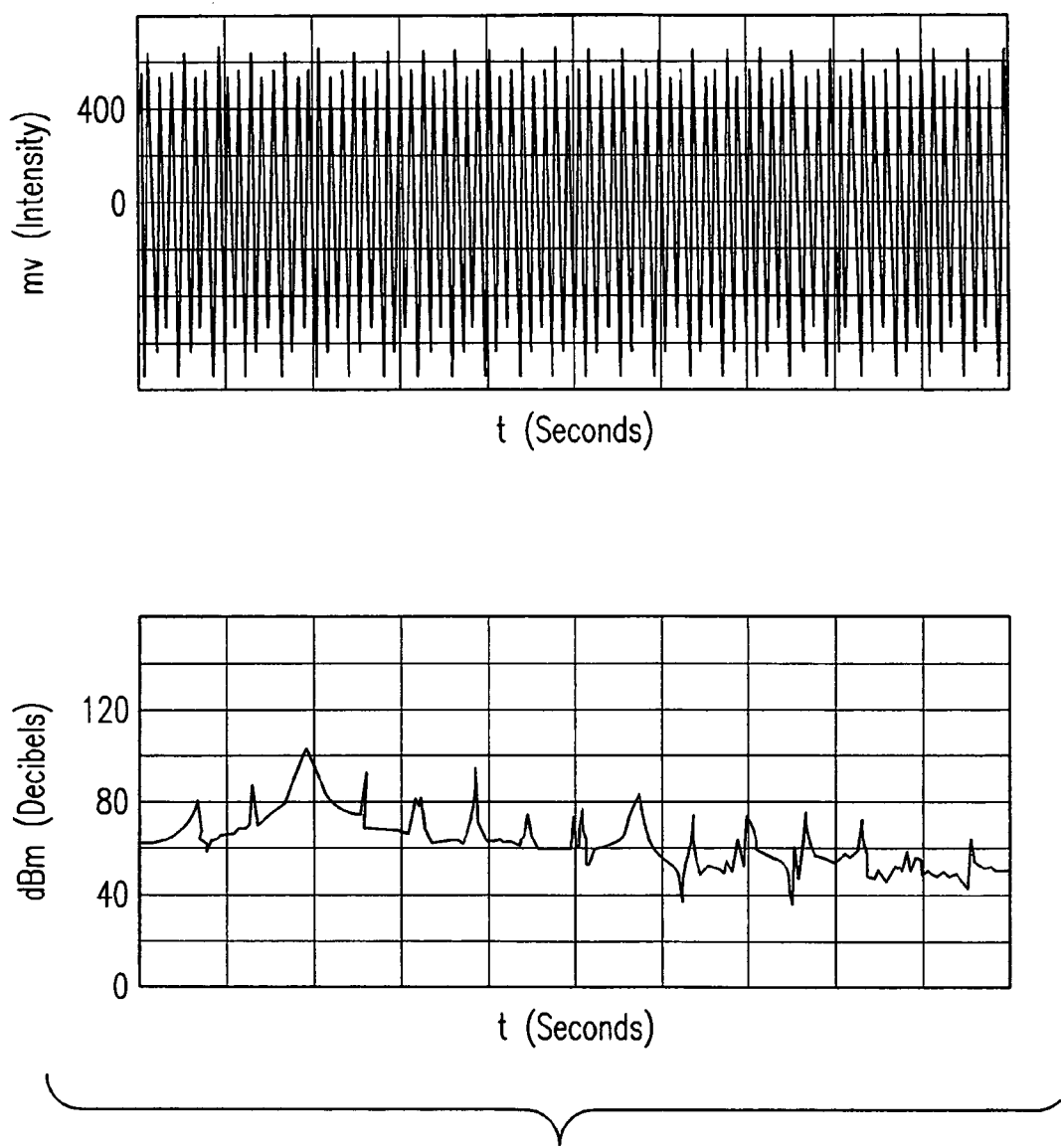
FIG. 5 is an exemplary computer screen display of processed information obtained from the sensing system.

Referring now to FIGS. 4a and 4b, the antenna 16 provides a conduit for the transmitted microwave 18 to be sent and for the reflected microwave 24 to be received. In more detail, the transmitted microwave 18 radiates from the antenna 16 on the blade 6 and strikes the vane 8 located with the area of coverage 50. The vane 8 reflects a reflected microwave 24 back to the antenna 16, which receives at least a portion of the reflected microwave 24. The reflected microwave 24 is then transmitted through the wave-guide 14 to the radar 10, and broadcast to the processing element 26 through a wave-guide, via telemetry or other suitable means.

The processing element 26 compares the wave parameters of the transmitted wave 18 with the wave parameters of the reflected wave 24. Comparable parameters include: intensity, frequency, and aperture of an electromagnetic beam (i.e. a plurality of electromagnetic waves 18). Thus, for example, if TBC has detached from the stationary vane 8, the intensity of the reflected electromagnetic wave 24 will increase.

By way of example, a small scale test was conducted by transmitting microwaves via a radar toward a blade rotating at about 430 revolutions per minute. The blade then reflected back the signal to the antenna mounted on a stationary support. The intensity level of the reflected microwaves reflected was approximately one third those reflected from the metallic blades. Those skilled in the art will readily appreciate that changes in the blade material, microwave, distance between the sending and reflecting blades, blade rotational speed, and the like will appreciably affect the intensity level difference, with any discernable intensity level suitable for purposes of this invention but differences between 5%–95% preferable for ease of data processing and calculation differences between 10%–50% most preferable.

Method of Assembly

Referring back to FIG. 1, components of the sensing system 10 may be mounted or installed within the turbine rotor shaft 4 of a turbine generator 2, although other locations are suitable, for example, stationary components such as ring segments or stationary vanes 8 that permit rotating and/or stationary components to be monitored. If the radar 12 is located in a harsh environment (i.e. inside the rotor shaft 4), a protective casing, covering or coating advantageously is used to protect the radar from the aggressive turbine flow path, as will be understood by those skilled in the art.

The illustrated wave guide 14 is inserted through a cooling channel of the turbine blade and traversed through the cooling channel exiting lower region of the blade 6 or blade attachment 52. However, the wave-guide 14 can be arranged in many other configurations to achieve the function of connecting the radar 12 with the antenna 16 as will be understood by those skilled in the art. The illustrated wave guide 14 continues through the blade carrier or blade disk 54. The wave guide 14 is connected to the radar at a predetermined location in the turbine 2, for example, in the rotor core at the shaft end-face.

Alternatively, a channel, groove or other suitable depression 30 that closely matches the exterior dimension and contour of the antenna 16 can be formed into the blade 6 so that the antenna 16 can be arranged within the channel to present a substantially continuous aerodynamic profile of the blade/antenna assembly. In another alternative, the exterior surface of the antenna 16 can be modified to closely match the aerodynamic profile of the blade 6. And, of course, both the antenna 16 and blade 6 can collectively be modified to closely match the aerodynamic profile.

The antenna 30 is operatively associated with the blade 6 or vane 8. For example, the antenna 16 can be mounted on the blade 6 or vane 8, in the blade 6 or vane 8, or in contact with the blade 6 or vane 8. Moreover, the antenna 16 can be directly connected to the blade 6 or vane 8 or indirectly connected to the blade 6 or vane 8 via an interconnection. Suitable direct connections include, but are not limited to, adhesives, bolts, weldments, combinations thereof, and the like. Suitable interconnections include, but are not limited to a connective layer, an insulating layer, a damper, combinations thereof, and the like. However, as one skilled in the art will appreciate, the direct and indirect connections can be achieved in other ways to operatively associate the antenna 16 with the blade 6 or vane 8.

The antenna 16 is advantageously located in the turbine 2 wherever good transmission of the electromagnetic wave 18 to the vane 8 can be obtained. In the illustrated embodiment, the antenna 16 is located on an outer surface of the blade 8 and directed toward the vane 8 to be monitored. However, the only requirement to be maintained is that the antenna 16 effectively transmits the electromagnetic wave 18 and receives the reflected electromagnetic wave 24.

The illustrated radar 12 is advantageously located in the turbine shaft 28 to be suitably close to the antenna 16 and protected from the harsh environment of the flow path. Since the physical distance from the radar 12 to the antenna 16 affects transmission losses, the radar 12 is advantageously located near the X—X Axis of the rotating blade 6.

Method of Operation

In operation, as illustrated, when the sensing system 10 is initiated, the radar 12 generates the microwave 18 that is transmitted through the wave-guide 14. The transmitted microwave 18 travels through the wave-guide 14 and reaches the antenna 16 housed on a turbine blade 6. The transmitted microwave 18 radiates the vane 8 and is reflected toward the antenna 16. At least a portion of the reflected microwave 24 is received by the antenna 16 and transmitted back through the wave-guide 14. The reflected microwave 24 is then sent, by a suitable means such as telemetry or wire, to a processing system 26 that compares parameters of the reflected microwave 24 to the same parameters of the transmitted microwave 18.

The present invention can also be configured such that a plurality of sensing system 10 components (e.g. antenna 16, wave-guide 14) are operatively connected to a single processing unit 26. For example, multiple antennae 14 could be mounted on a single blade 6 thereby increasing the area of coverage 50 for a row of vanes 8. The present invention can also be configured such that a plurality of sensing systems 10 are operatively connected to a single processing unit 26. Of course, other combinations of sensing system 10 components and processing units 26 can be used.

The processor advantageously interprets the intensity of the reflected microwave 24 over an extended period (e.g. between inspection intervals). For example, an increase in the intensity of the reflected microwave 24 of the vane 8 would indicate that TBC has detached from the reflecting vane 8. Thus, the increase in intensity of the reflected microwave 24 can be translated to a monitoring signal to ouptut on a display screen a statement such as "Loss/No Loss on Blade #xxx", where the parameter #xxx would be the stationary vane 8 number in a particular row of stationary vanes 8 in the turbine 2. With a sensitivity of sufficient magnitude and an intensity change above ambient electronic noise, a percentage of TBC loss can be derived from the signal and associated to a particular stationary vane 8. Data can be interpreted and stored by the processor in real time or non real time. Non real time in this context refers to any time, time interval, or time period greater than real time.

The received radar signals are preferably output in a form that suitably displays the processed information. For example, early radar systems used a simple amplitude scope(a display of received signal amplitude, or strength, as a function of distance from the antenna). Another suitable output media is a plan position indicator (PPI), which displays the direction of the target in relation to the radar system as an angle measured from the top of the display, while the distance to the target is represented as a distance from the center of the display. A graphical output 60 advantageously allows the data to be displayed in a real time fashion because of the capabilities of modem central processing units. Alternatively, the data could be stored separately and used with a suitable program or database and analyzed at a later date. Lastly, the output could be used and compared to other output for the purpose of determining trends in the systems being monitored.

Although the blade surfaces of turbines may also be inspected by various acoustic, optical, and infrared methods as they rotate through the line-of-sight of a lens or a fiber-optic inspection device, it is not advantageous to do so for stationary vanes 8 since stationary vanes 8 would require numerous lenses to obtain sufficient coverage of a complete row of the stationary vanes 8 (e.g. a row may number from 32 to 80 vanes). The current invention is particularly beneficial to inspect the stationary vanes 8.

While the preferred embodiments of the present invention have been shown and described herein, it will be obvious that such embodiments are provided by way of example only. Numerous variations, changes and substitutions will occur to those of skill in the art without departing from the invention herein. Also, one or more aspects or features of one or more embodiments or examples of the present invention may be used or combined with one or more other embodiments or examples of the present invention. Accordingly, it is intended that the invention be limited only by the spirit and scope of the appended claims.

The invention claimed is:

1. An apparatus for the non-destructive monitoring of a coated metallic turbine component, comprising:
    an electromagnetic wave generator that generates an electromagnetic wave;
    a transmitter arranged on a surface of a first turbine component and sized and configured to closely match an existing aerodynamic surface contour of the first turbine component and that transmits the generated electromagnetic wave from the first turbine component;
    a second turbine component that receives the transmitted electromagnetic wave and reflects the electromagnetic wave;
    a receiver that receives the reflected electromagnetic wave; and
    a processor that interprets the received electromagnetic wave.

2. The apparatus as claimed in claim 1, wherein the electromagnetic wave generator is a Doppler radar and the electromagnetic wave generated is a microwave.

3. The apparatus as claimed in claim 1, wherein the transmitter and receiver is an antenna and is a horn antenna.

4. The apparatus as claimed in claim 3, wherein a plurality of antennae are located on the surface of the turbine component and each antenna is adapted to send and receive the electromagnetic wave and transmit a signal to a processor.

5. The apparatus as claimed in claim 1, wherein the metallic turbine component is coated with a ceramic thermal barrier coating.

6. The apparatus as claimed in claim 1, wherein the metallic turbine component is a super-alloy blade or vane.

7. The apparatus as claimed in claim 1, wherein the transmitter and receiver are embodied as the same component.

8. The apparatus as claimed in claim 1, wherein the frequency of the generated electromagnetic wave is between of 1 giga hertz and 100 giga hertz.

9. The apparatus as claimed in claim 8, wherein the frequency of the generated electromagnetic wave is between 20 giga hertz and 50 giga hertz.

10. The apparatus as claimed in claim 1, wherein the radar generates and emits the electromagnetic wave continually, randomly, intermittently, or graduated.

11. The apparatus as claimed in claim 1, wherein a wave-guide comprises a plurality of sections having differing cross sectional geometries interconnected to form a continuous wave-guide.

12. A method for real time monitoring of damage to a turbine component in an operating turbine generator, comprising:
    transmitting a signal in the form of an electromagnetic wave from a transmitter arranged on a surface of a first turbine component and sized and configured to closely match an existing aerodynamic surface contour of the a first component;
    receiving the signal transmitted from the first component by a second component;
    reflecting the transmitted signal off the second component back to the transmission source;
    processing the transmitted and reflected signals to determine if the turbine component is damaged.

13. The method as claimed in claim 12, wherein the first component is a turbine blade.

14. The method as claimed in claim 13, wherein the second component is a turbine vane.

* * * * *